United States Patent [19]

Paulsson

[11] Patent Number: 4,922,364
[45] Date of Patent: May 1, 1990

[54] SERIES CAPACITOR EQUIPMENT
[75] Inventor: Lars Paulsson, Västerås, Sweden
[73] Assignee: Asea Brown Boveri AB, Västerås, Sweden
[21] Appl. No.: 306,173
[22] Filed: Feb. 6, 1989
[30] Foreign Application Priority Data
  Feb. 15, 1988 [JP] Japan .................................. 8800497
[51] Int. Cl.$^4$ .............................................. H02H 7/16
[52] U.S. Cl. ........................................ 361/16; 361/56; 361/57; 361/90; 361/93
[58] Field of Search .................. 361/8, 13, 15, 16, 86, 361/87, 89, 90, 91, 92, 93, 57, 56

[56]  References Cited
  U.S. PATENT DOCUMENTS
  4,174,529 11/1979 Hamann ................................ 361/16
  4,259,704  3/1981 Hamann ................................ 361/16
  4,322,766  3/1982 Becker et al. ........................ 361/15
  4,432,029  2/1984 Lundqvist ............................ 361/16
  4,625,254 11/1986 Fahlén ................................. 361/16

Primary Examiner—Derek S. Jennings
Attorney, Agent, or Firm—Pollock, Vande Sande & Priddy

[57] ABSTRACT

Series capacitor equipment for distribution networks has a capacitor, voltage-dependent resistors as overvoltage protective means for the capacitor, a mechanical high-speed circuit-closer and a switch connected in parallel with the high-speed circuit-closer, for bypassing the equipment. At an overcurrent in the power line, tripping members initiate closing of the high-speed circuit-closer, which closes rapidly sufficient to protect the resistors against overload, and of the switch, which relieves the high-speed circuit-closer. The high-speed circuit-closer, the switch and the tripping members are mounted in a grounded cubicle.

19 Claims, 4 Drawing Sheets

FIG. 3a
FIG. 3b
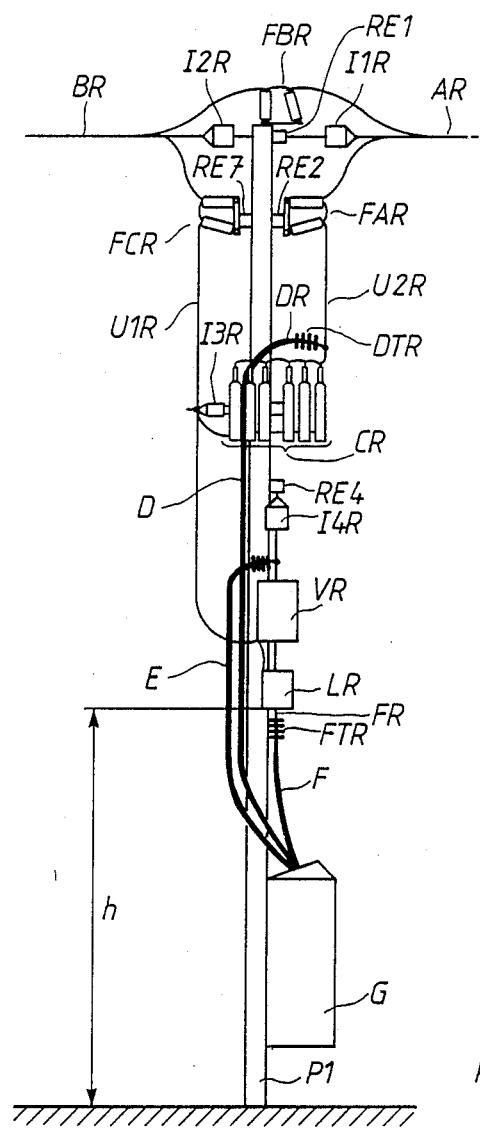
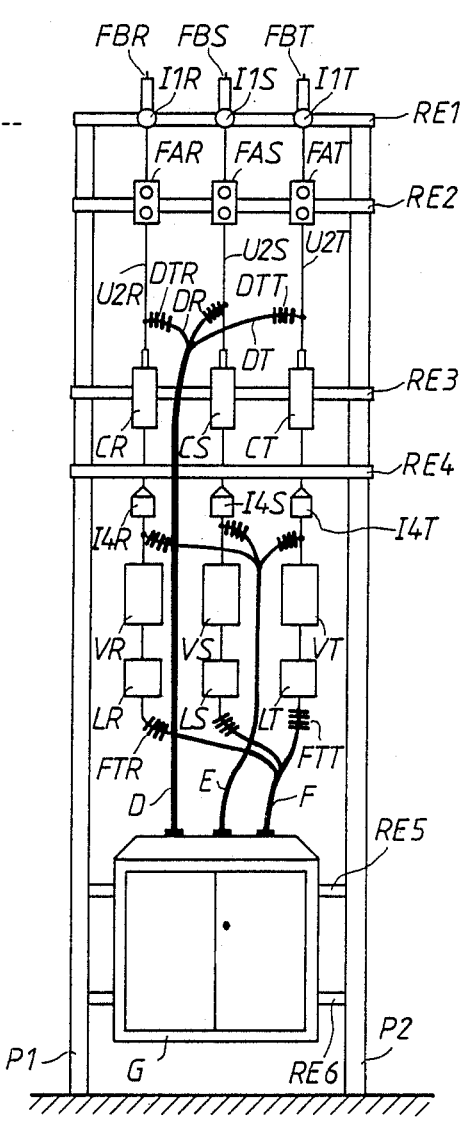

SERIES CAPACITOR EQUIPMENT

TECHNICAL FIELD

The present invention relates to series capacitor equipment for distribution networks with a capacitor bank for connection into a power transmission line, with a voltage-dependent resistor, connected in parallel with the capacitor bank, for protection of the capacitor bank against overvoltages, and with bypass members for bypassing the capacitor and the resistor at an over-current through the equipment.

BACKGROUND ART

By distribution networks in this application are meant electric a.c. networks for distribution of electric power at voltages of up to about 50 kV. Normally, such networks are of three-phase design but the invention can also be applied to, for example, single-phase networks. The concept distribution network in this connection also includes networks for distribution of electric power for special purposes, for example for power supply of railway systems.

It is previously known to use series compensation in distribution networks, which, inter alia, gives the following advantages:
reduced line voltage drop
reduction of the line losses
reduced voltage variations
increased transmission capacity
increased power factor
simplified start-up of large motors.

By series compensation of a highly loaded distribution line, a reconstruction can be avoided or postponed. The reduction of the line losses which is achieved by a series compensation can result in considerable savings of costs.

In series capacitor equipment of the kind referred to here, circuit breakers of outdoor type have been used for bypassing of the capacitor, which, on the one hand, entails a high price and, on the other hand, are normally installed on the ground, which requires the acquisition of ground and the provision of fences. Spark gaps have been used as overvoltage protective means. However, it is difficult to obtain a satisfactory function of these spark gaps at the low voltages which are used in distribution networks (e.g. difficult to avoid unjustified trippings), and, furthermore, they require extensive maintenance.

Therefore, for reasons of reliability and cost, series compensation equipment has only had limited use in distribution networks.

SUMMARY OF THE INVENTION

The present invention aims to provide series compensation equipment for distribution networks, which
entails a low price,
has a simple and compact design,
provides satisfactory protection of the components of the equipment under all operating conditions, including fault states (line fault, voltage drop out, ferro-resonance0,
has a high reliability,
does not require the acquistion of ground or the provision of fences,
can be standardized in a simple manner,
can be pre-tested in a simple manner in the factory, and
can be transported and installed in a simple manner.

Equipment according to the present invention is characterized in that the by-pass members comprise a high-speed circuit-closer connected in parallel with the capacitor and the resistor, a load switch connected in parallel with the high-speed circuit-closer, as well as tripping members adapted to intitate closing of the high-speed circuit-closer and the switch at an overcurrent through the equipment.

The concept of high-speed circuit-closer shall be taken to mean a mechanical switching device with a contact system which can be rapidly brought together into a closed position. In a high-speed circuit-closer no demands whatsoever are placed on the breaking capacity (deionization) and no demands are placed on the ability to continuously carry current. A high-speed circuit-closer has a considerably shorter closing time (e.g. 5-30 ms) than a switch of the kind which can be used in the invention (e.g. 100 ms). Also, in a high-speed circuit-closer of the kind referred to, no demands are placed on the insulation distance between the contacts beyond the level of protection determined by the voltage-dependent resistors.

The high-speed circuit-closer provides a possiblity of using, for example, ZnO varistors as overvoltage protective means for the capacitor bank. Such varistors withstand a relatively low energy without being destroyed but can be effectively protected by the high-speed circuit-closer. The latter can be given a simple and inexpensive design since it requires no breaking capacity and since it only needs to carry current during the time that is required for closing of the switch. The switch, in turn, can be designed in a simple and inexpensive manner since no demands are placed on a specially rapid function thereof. Further, it need only have such a good breaking capacity that it manages the connection of the capacitor at rated current.

According to one embodiment of the present invention, by by-pass members and their control equipment are mounted in a grounded cubicle, which makes it possible for these units to be of indoor type, with a resultant low price. Further, the cubicle can be pre-tested, transported and mounted in a simple manner. The capacitors and the voltage-dependent resistors are suitably mounted in a power line pylon at a safe level above ground, that is at a high enough level to provide protection against personnel coming into contact with live components, and connected to the cubicle through insulated cables, preferably with grounded shields, thus avoiding the requirements for fences in a simple and inexpensive manner. Preferably, also the cubicle is mounted in the pylon, and therefore the acquisition of ground for erection of the equipment can be totally dispensed with.

BRIEF DESCRIPTION OF THE DRAWING

The invention will be described in greater detail below with reference to the accompanying FIGS. 1-5, wherein FIGS. 3a and 3b show equipment according to FIGS. 1 and 2, which is installed in its entirety in a power line pylon.

DESCRIPTION OF THE PREFERRED EMBODIMENTS

Figure 1:
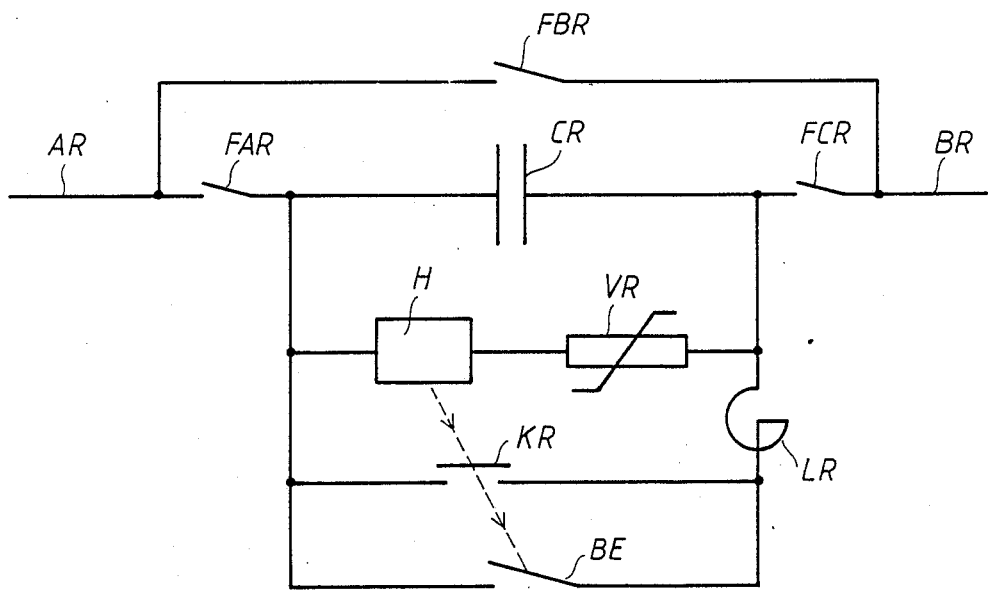
FIG. 1 is a diagram showing the principle of equipment according to the invention.

FIG. 1 shows one phase of a three-phase equipment according to the present invention. From each side the phase conductors AR and BR are connected to the capacitor bank CR through the disconnectors FAR and FCR. By means of a third disconnector FBR, the equipment can be by-passed and hence be disconnected from the line with the aid of the other two disconnectors. In parallel with the capacitor CR a zinc oxide varistor VR is arranged, acting as overvoltage protective means for the capacitor. In parallel with the capacitor and the varistor combination, a high-speed circuit-closer KR and a switch BE are arranged. The switch is a so-called load switch, designed to be able to break the rated current of the network but not short-circuit currents. It is a mechanical switch. These switching members are open during normal operation. A control circuit H, which comprises current-sensing members sensing the varistor current, initiates closing of the two switching members at an overvoltage across the capacitor. The high-speed circuit-closer KR is closed very rapidly - within, for example, 0.5 to 3 half-cycles of the main voltage - and protects the varistor against overload. The switch BR, which has a closing time of, for example, 100 ms, thereafter closes and by-passes the equipment.

The high-speed circuit-closer KR need not be dimensioned for continuous current, it need have no breaking capacity, and it need not meet any requirements for insulation distance between the contacts beyond the level of protection of the variston VR. The high-speed circuit-closer can therefore be given the desired, rapid function in a simple manner. It may, for example, comprise a spring-biassed contact with a short contact travel which is kept in open position by a permanent magnet. Upon tripping, a trip coil provides a field which counteracts the permanent magnet, whereby the spring very rapidly moves the movable contact towards the fixed contact. A so-called short-circuting device of any known kind may be used.

To suppress the surge currents which may arise when closing the by-pass members, a damping inductor LR is arranged in series with these members. It suitably consists of an air inductor.

Figure 2:
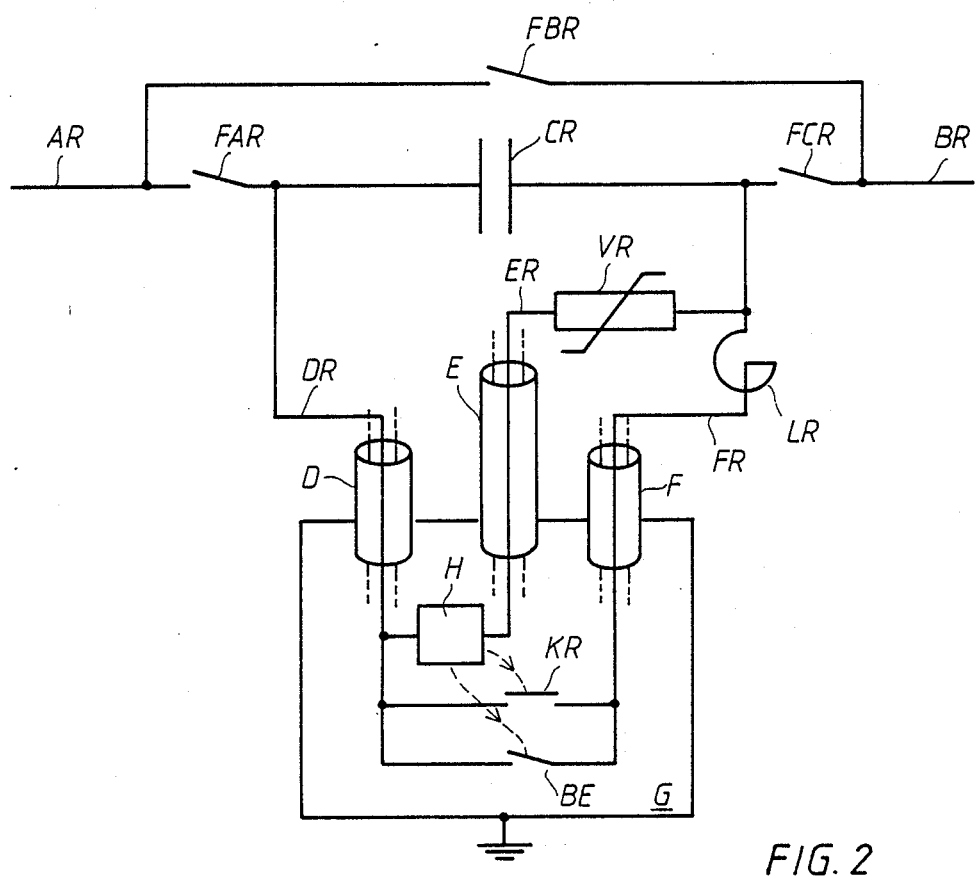
FIG. 2 shows equipment according to FIG. 1, in which the by-pass members are arranged in a grounded cubicle and connected to the capacitor bank and the voltage-dependent resistors via cables.

FIG. 2 shows how the by-pass members KR, BE and the control circuit H may be arranged in a grounded cubicle G. The units arranged in the cubicle are connected to the other units of the equipment with the aid of three-phase cables D, E, F, for example so-called PEX cables. Like FIG. 1, FIG. 2 only shows one phase the R-phase of a three-phase equipment. The other two phases are identical with the shown phase. Of the cables, the phase conductors DR, ER, FR belonging to the R-phase are shown and the other two phase conductors merely indicated.

FIGS. 3a, 3b show equipment according to the invention present, mounted in a double pole. FIG. 3a shows the equipment seen perpendicular to the power line and FIG. 3b shows the equipment seen in the direction of the power line. The three conductors AR, AS, AT, arriving at the pole from one side, are fixed to the insulators I1R, I1S, I1T. The three conductors BR, BS, BT, arriving at the pole from the opposite side, are fixed to the insulators I2B, I2S, I2T. The two conductors belonging to the same phase are connected to disconnectors FBR, FBS, FBT (which may be designed as one three-phase disconnector) arranged on a crossarm RE1, which disconnectors are normally open. Through normally closed disconnectors FAR, FAS, FAT, mounted on the crossarm RE2, and via conductors U2R, U2S, U2T, the three conductors AR, AS, AT are connected to the three capacitor banks CR, CS, CT, which are mounted on a crossarm RE3 but insulated therefrom. Through the three similarly normally closed disconnectors FCR, FCS, FCT, mounted on the crossarm RE7, and through the conductors U1R, U1S, U1T, the three conductors BR, BS, BT are connected to the capacitors and to the points of connection between the varistors VR, VS, VT and the damping inductors LR, LS, LT. The conductors U1R, U1S, U1T are spaced from the pole and the crossarms by insulators I3R, I3S I3T. The varistors are suspended from a crossarm RE4 via insulators I4R, I4S, I4T. Below each varistor and electrically connected thereto, the damping inductor (LR, LS, LT) of the same phase is suspended.

A ground cubicle G is mounted on crossarms RE5, RE6, the bypass members and their control circuits being mounted in the cubicle. A three-phase PEX cable D connects the units arranged in the cubicle G to that side which faces the disconnectors FA. A similar cable E connects the units arranged in the cubicle to the varistors, and a similar cable F connects the units arranged in the cubicle to the damping inductors. Each phase conductor of the cables is provided with a terminal, for example DTR, DTT, FTR, FTT, which are only schematically shown in the figures.

The live units of the equipment arranged outside the cubicle G are all applied at a level above the ground which at least amounts to the value "h" in FIG. 3a at which it is considered that no risk of personnel coming into contact with live components exits, for example 6 m. These units, and the connections therebetween, can therefore have a completely unprotected design, which results in the lowest possible price and simple mounting.

With the aid of the grounded cubicle G and the cables D, E, F, satisfactory protection against contact with the parts of the equipment mounted at a level lower than "h" is obtained in a simple manner.

Figure 4:
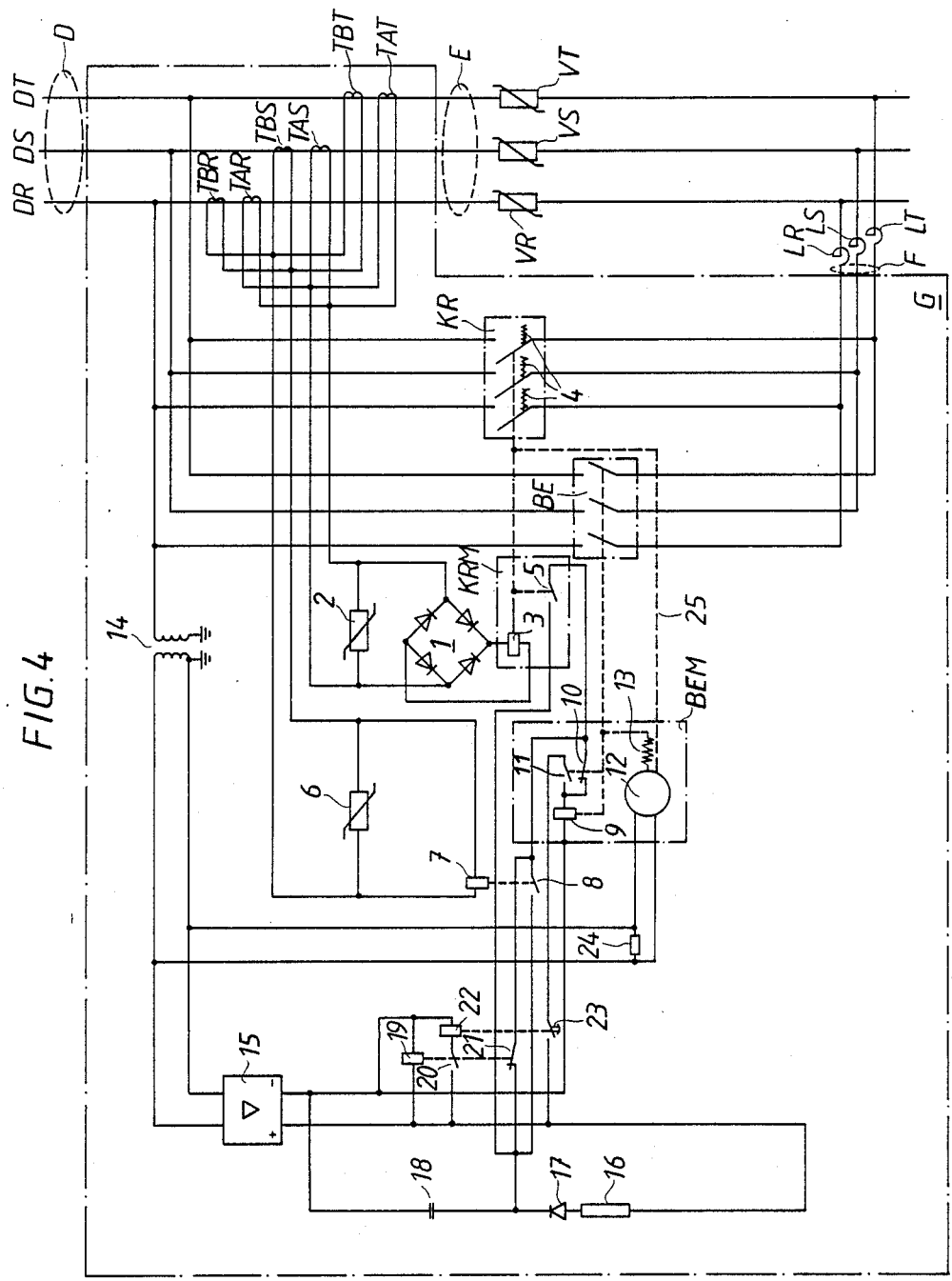
FIG. 4 shows an example of a possible design of the control circuits for equipment according to the invention.

FIG. 4 shows an example of how the units and the circuits arranged in the cubicle G can be formed. The cubicle is marked in the figure by a dash-dotted line. Of the equipment components located outside the cubicle, the figure shows the varistors VR, VS and VT, the cables D (with the phase conductors DR, DS, DT), E and F and the inductors LR, LS, LT.

The three current transformers TAR, TAS, TAT are connected in series with the varistors VR, VS, VT. Their secondary windings are connected, in parallel with each other, to a rectifier bridge 1, which has a varistor 2 as overvoltage protective means. The d.c. output of the bridge is connected to the operating coil 3 of the operating device KRM of the high-speed circuit-close KR. The high-speed circuit-closer KR is shown in an open position, the springs 4 being tensioned. Upon a line fault (short-circuit, ground fault), a current will flow through any of the varistors VR, VS, VT. A current is then obtained through the operating coil 3, which releases the movable contact members of the high-speed circuit-closer, the springs 4 then rapidly closing the contacts of the high-speed circuit-closer. At the same time, the auxiliary contact 5 of the operating device is closed.

The switch BE is shown in open position. It has the operating device BEM with the operating coil 9 and the auxiliary contacts 10, 11. Further, the operating device has an operating motor 12, which, after closing of the switch, tensions the operating spring 13 of the switch. At the same time the operating springs 4 of the high-speed circuit-closer KR are tensioned via a mechanical link transmission 25, the contacts of the high-speed circuit-closer then being opened.

The energy supply to the operating circuits is obtained from the power line via a voltage transformer 14 and a rectifier 15. A capacitor 18 is connected to the rectifier output, which capacitor is charged via a resistor 16 and a diode 17 and which ensures that the voltage is maintained for a certain time after drop out of the mains voltage. An undervoltage relay 19 is connected to the output of the rectifier. At normal mains voltage, its contact 20 is closed and its contact 21 open. If the mains voltage drops below a predetermined level, the contact 20 is opened and the contact 21 closed. A time-lag relay 22 is supplied via the contact 20 and its contact 23 is closed a predetermined time interval (e.g. 10–30 s) after the relay coil has become energized.

Three current transformers TBR, TBS, TBT, connected in series with the varistors VR, VS, VT, have their secondary windings connected to an overcurrent relay 7, which has a varistor 6 as overvoltage protective means. The relay and its current transformers are so dimensioned that the contact 8 of the relay is closed at a current through any of the varistors VR, VS, VT which is much lower than the varistor current which provides tripping of the high-speed circuit-closer KR. The relay thereby indicates low fault currents, which may give a slow overload of the series capacitors, and also such faults in a varistor which give an unacceptable increase of the leakage current of the varistor.

When connecting the equipment into the line or when energizing the line, the switch BE is in closed position. The contact 20 of the undervoltage relay is closed and its contact 21 opened. At the same time the operating device of the switch is charged. When the interval set in the time-lag relay 22 has elapsed, the contact 23 is closed, the operating coil of the switch receives voltage via the closed contact 11 and the switch opens, whereafter the series capacitor equipment is connected into the line. The operating device of the switch is again charged, whereupon the switch is ready for closing.

If the line voltage drops out or drops below a predetermined level, the contact 21 of the undervoltage relay is closed, the operating coil 9 is energized through the contact 10 and the switch is closed. When the normal line voltage returns, the operating device is charged and connection of the series capacitor is obtained after the time determined by the time-lag relay in the manner described above. By this delay switching in of the capacitor, the risk of ferro-resonance when switching in the line is reduced.

In case of a line fault (a short-circuit or a low-ohmic ground fault), the high-speed circuit-closer is tripped and gives a very rapid bypassing of the series capacitor equipment, whereby the varistors VR, VS, VT are protected against thermal overload. Via the contacts 5 and 10, a tripping signal is supplied to the switch, which closes and prevents overload of the high-speed circuit-closer KR. Normally, the line is hereafter rapidly disconnected by the line circuit-breakers.

When the line is again switched in, the operating device is charged, whereby also the high-speed circuit-closer KR opens and its operating springs 4 are tensioned. After the set time delay, the switch BE opens and switches in the series capacitor.

At low fault currents or in case of a malfunction in any of the varistors, the overcurrent relay 7 is activated, the operating coil 9 receives voltage through the contacts 8 and 10, and the switch closes and bypasses the series capacitors and the varistors, which are then protected against overload.

A heating resistor 24 which is supplied from the voltage transformer 14, and which may be thermostat-controlled, maintains the interior of the cubicle G at a suitable temperature and ensures the desired function of the units arranged in the cubicle and also provides freedom from condensation.

Figure 5:
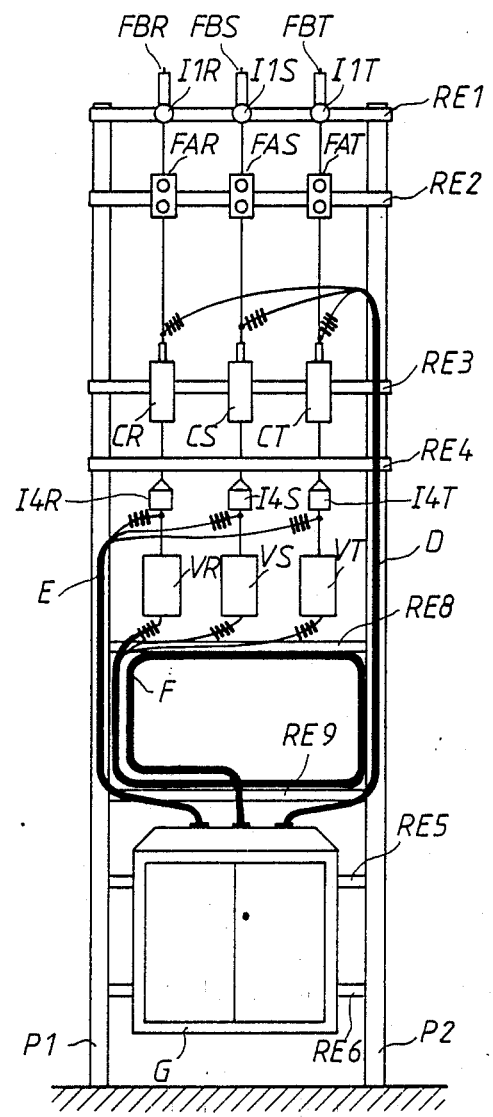
FIG. 5 shows how the requisite damping inductance in series with the by-pass members can be obtained with the aid of the cables which connect the cubicle to the other components of the equipment.

FIG. 5 shows an embodiment of the invention in which the damping inductors LR, LS, LT in FIGS. 1-4 can be dispensed with. The cable F is disposed on poles P1, P2 and the crossarms RE8, RE9 in a loop in sufficient length and in a sufficient number of turns to give the desired damping inductance. The necessary damping inductance is, for example, of the order of magnitude of 50 $\mu$H and can be obtained in this way in a simple manner with few turns of the cable loop.

The embodiments of the invention described above are only examples of equipment within the scope of the invention.

As an alternative to the above embodiments, for example, the electric tripping of the switch from the high-speed circuit-closer (via the auxiliary contact 5) may be replaced by a mechanical connection from the high-speed circuit-closer to the switch.

The members which sense the current through the varistors can be arranged to trip the bypassing of the equipment in dependence on the time integral of the varistor current, which time integral is proportional to the energy development in the varistors. The overcurrent relay 7 in FIG. 4 may then be omitted, if desired.

Instead of the varistor current, the capacitor or line current may be sensed and used as a criterion for tripping of the bypassing of the series capacitors.

To ensure the desired division of current between the switch and the high-speed circuit-closer, these two members and their leads may be designed so as to obtain suitable impendance conditions. For example, an extra impedance can be arranged in series with the high-speed circuit-closer, for example by making the leads of the high-speed circuit-closer of a material with a higher resistance than copper (e.g. iron). Such an extra resistance also provides improved attenuation of any oscillations upon closing of the switching device.

I claim:

1. Series capacitor equipment for distribution networks with a capacitor bank for connection into a power line, comprising:
   a voltage-dependent resistor, a connected in parallel with the capacitor bank, for protection of the capacitor bank against overvoltages;
   first and second bypass means for bypassing the capacitor and the resistor during an overcurrent through the equipment, said first bypass means including a high-speed circuit-closer connected in parallel with said voltage-dependent resistor for bypassing said resistor;

said second bypass means including a switch, connected in parallel with said high-speed circuit-closer; and tripping members for controlling the closing of said highspeed circuit-closer and of said switch at an overcurrent in the power line, and said high-speed circuit-closer being a mechanical switching device.

2. Series capacitor equipment according to claim 1, wherein said bypass members are mounted in a grounded cubicle, which is positioned at a power line pylon, and wherein said capacitor bank and said voltage-dependent resistor is placed in the pylon at a safe level above the ground and connected to the cubicle by means of cables.

3. Series capacitor equipment according to claim 2, wherein the cubicle is mounted on the pylon.

4. Series capacitor equipment according to claim 1, wherein said tripping member for controlling said switch comprises voltage-sensing members for closing of said switch if the voltage of the power line drops below a predetermined level.

5. Series capacitor equipment according to claim 2, further comprising delay members adapted, when energizing the equipment, to delay the opening of the switch.

6. Series capacitor equipment according to claim 1, further comprising current-sensing members adapted, at an increased current through said voltage-dependent resistor, to initiate closing of sad switch only.

7. Series capacitor equipment according to claim 1, further comprising damping inductances arranged in series with said bypass means.

8. Series capacitor equipment according to claim 2, wherein at least one of the cables is disposed in a loop to form a damping inductance.

9. Series capacitor equipment according to claim 3, wherein said tripping members comprise current-sensing members adapted to sense the current through said voltage-dependent resistors to initiate closing of both, the high-speed circuit-closer and said switch, if this current exceeds a predetermined level.

10. Series capacitor equipment according to claim 2, wherein said tripping members for said switch comprise voltage-sensing members adapted to initiate closing of said switch if the voltage of the power line drops below a predetermined level.

11. Series capacitor equipment according to claim 3, wherein said tripping members for said switch comprise voltage-sensing members adapted to initiate closing of said switch if the voltage of the power line drops below a predetermined level.

12. Series capacitor equipment according to claim 2, further comprising delay members adapted, when energizing the equipment, to delay the opening of said switch.

13. Series capacitor equipment according to claim 4, further comprising delay members adapted, when energizing the equipment, to delay the opening of said switch.

14. Series capacitor equipment according to claim 2, comprising current-sensing members adapted, at an increased current through said voltage-dependent resistors, to initiate closing of said switch only.

15. Series capacitor equipment according to claim 2, further comprising damping inductances arranged in series with said bypass members.

16. Series capacitor equipment according to claim 7, wherein at least one of the cables is disposed in a loop to form a damping inductance.

17. Series capacitor equipment according to claim 1, further comprising delay members adapted, when energizing the equipment, to delay the opening of the switch.

18. Series capacitor equipment according to claim 1, wherein said tripping members comprise current-sensing members adapted to sense the current through said voltage-dependent resistors to initiate closing of both, the high-speed circuit-closer and said switch, if this current exceeds a predetermined level.

19. Series capacitor equipment according to claim 15, wherein at least one of the cables is disposed in a loop to form a damping inductance.

* * * * *

UNITED STATES PATENT AND TRADEMARK OFFICE
CERTIFICATE OF CORRECTION

PATENT NO. : 4,922,364
DATED : May 1, 1990
INVENTOR(S) : Lars Paulsson

It is certified that error appears in the above-identified patent and that said Letters Patent is hereby corrected as shown below:

On the face of the patent, change

"[30]  Foreign Application Priority Data

Feb. 15, 1988 [JP]  Japan ......8800497" to:

--[30]  Foreign Application Priority Data

Feb. 15, 1988 [SE]  Sweden ...... 8800497--.

Signed and Sealed this

Thirty-first Day of December, 1991

Attest:

HARRY F. MANBECK, JR.

*Attesting Officer*          *Commissioner of Patents and Trademarks*